United States Patent [19]
Bogaerts et al.

[11] Patent Number: 5,595,454
[45] Date of Patent: Jan. 21, 1997

[54] PANEL ASSEMBLY

[75] Inventors: Constant Bogaerts, Schilde; Eric Van Echelpoel, Lier; Henri Goossen; Luc Van Goethem, both of Wilrijk; Luc Van Aken, Kuringen, all of Belgium

[73] Assignee: Agfa-Gevaert N.V., Mortsel, Belgium

[21] Appl. No.: 260,911

[22] Filed: Jun. 15, 1994

[30] Foreign Application Priority Data

Jul. 12, 1993 [EP] European Pat. Off. ............ 93202055

[51] Int. Cl.⁶ .................. F16B 5/00; H05K 5/02; H05K 7/18
[52] U.S. Cl. .................. 403/263; 403/14; 403/244; 29/466; 29/464; 211/26; 248/223.41; 361/802; 361/796; 361/752
[58] Field of Search .............. 83/694, 686; 29/464, 29/466; 174/35 R, 35 MS; 361/752, 756, 796, 797, 802, 816, 818; 248/224.8, 223.41, 150; 211/26, 41; 403/13, 14, 263, 244, 242, 231

[56] References Cited

U.S. PATENT DOCUMENTS

| | | |
|---|---|---|
| 3,851,222 | 11/1974 | Michalak et al. |
| 4,648,298 | 3/1987 | Sutton ............................ 83/694 X |
| 5,291,376 | 3/1994 | Mills ............................ 361/752 X |

FOREIGN PATENT DOCUMENTS

| | | | |
|---|---|---|---|
| 3335664 | 4/1985 | Germany | 174/35 R |
| 1-274496 | 11/1989 | Japan | 361/802 |
| 3-6097 | 1/1991 | Japan | 361/752 |
| 3-252198 | 11/1991 | Japan | 361/796 |
| 4-28300 | 1/1992 | Japan | 361/752 |

*Primary Examiner*—Anthony Knight
*Attorney, Agent, or Firm*—William J. Daniel

[57] ABSTRACT

The present invention provides an assembly of a first panel formed with at least one insertion slot and a second panel carrying at least one projecting tab extending outwardly of at least one of its edges and fitting in the slot. The tab has on at least one of its sides a shoulder defining an edge which is located along the projecting length of the tab at a position intermediate the free edge of the tab and its base. The shoulder edge is in abutting contact with a region of the first panel adjacent one of the insertion slot and thus maintains the associated edge of the second panel out of contact with the first panel so that the relative positions of the panels is determined by such abutting contact. The first and second panels can be positively secured together by means of an interconnection element, preferably in the form of an integral flange bent up from one of the panels, which is attached to one or both other panel by screws, bolts and nuts or similar attachment devices. The plane of an integral interconnection element should be displaced inwardly of the plane of the shoulder edge to prevent interference with the precise locating function of the shoulder edge.

13 Claims, 7 Drawing Sheets

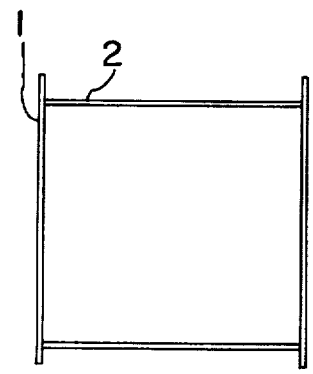
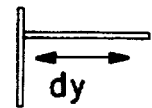
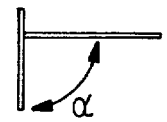
FIG. 1A  FIG. 1B  FIG. 1C
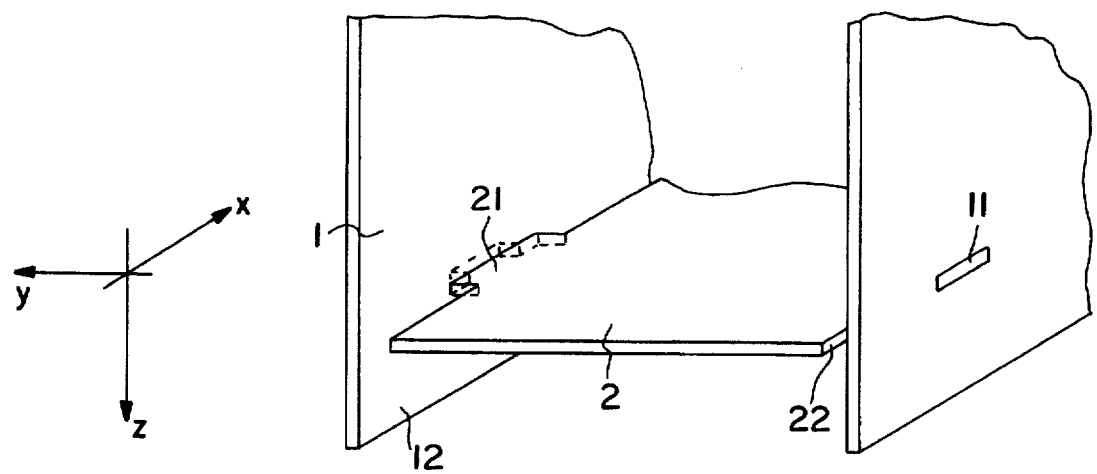
FIG. 2

PANEL ASSEMBLY

FIELD OF THE INVENTION

This invention relates to a panel assembly, which is particularly suitable for application in certain kinds of apparatus, and to a method for mechanical assembling the same.

BACKGROUND OF THE INVENTION

Most kinds of apparatus, such as e.g. a photographic camera, a processor for exposed materials, an optoelectronic scanner, a xerographic copier, or a thermal printer, are mounted within a generally rectangular housing, which may include a rectangular metal frame for supporting various parts of the apparatus.

In many of these apparatus, the metal frame is made up at least in part from panels and the mechanical geometry of the frame panels, especially the relative distance between them, is very important in order to guarantee that the apparatus be of good quality and operate reliably.

The frame of the apparatus thus has to be designed and manufactured to satisfy rather small and demanding tolerances, thereby minimising the creation of disturbing gaps or separation between panels. In addition, the frame thus formed needs a geometry which requires no adjustment after assembly and which remains stable over time.

In one prior art instance, precise positioning and fastening of two panels in an apparatus was generally accomplished in a rather complicated way, including crossbars which were either manually adjustable in length or were available in fixed high precise manufactured lengths.

In another prior art context, in order to save mounting time, screw receptacles were used as disclosed in U.S. Pat. No. 3,967,432 and in "Research Disclosure" no 34449 (Dec. 1992). However, even with these techniques, supplementary positioning means are still needed in practice for assembling the panels, with inevitable increased material costs. In addition, this second prior art teaching does not guarantee high geometrical precision in the positions of the panels in question.

OBJECT OF THE INVENTION

Accordingly, it is an object of the present invention to provide an improved assembly of a first panel with another panel in a well defined geometrical relationship such that the distance between said panels is correct in at least one direction, without the need to resort to supplementary positioning means or to complicated machining. The improvement mainly consists in attaining a precise and stable geometry for the panel assembly by money saving manufacturing and mounting techniques.

These and other objects of the invention will become apparent from the following description.

SUMMARY OF THE INVENTION

We now have found that the above objects can be achieved by providing an assembly of a first panel having at least one insertion slot therein, and a second panel includes a body portion which is provided with at least one projecting tab extending outwardly from one edge thereof and fitting in the insertion slot, wherein the tab has at least one shoulder located at a point along the projecting length of the tab which is intermediate a top or free end of the tab and a base or bottom of the tab adjacent the one edge of the panel, and wherein such shoulder is in abutting contact with the first panel, with the one edge of the second panel being held spaced away from and out of contact with the first panel.

According to a preferred embodiment of the present invention, the second panel body portion and the tab normally lie in the same plane and the body portion further is provided adjacent at least one side of the tab with angled portion extending angularly of the plane of the body portion, and wherein the second panel is secured to the first panel by fastening means engaging the angled portion and the first panel.

Further embodiments of the present invention are set forth in the detailed description given hereinbelow.

BRIEF DESCRIPTION OF THE DRAWINGS

The invention will be described with reference to the accompanying drawings without limiting the invention thereto, in which:

FIG. 1A is a schematic view of an apparatus with a frame comprised of panels and FIGS. 1B and 1C are detail view of a corner of the frame;

FIG. 2 is a fragmentary perspective view of a panel assembly according to the present invention;

DETAILED DESCRIPTION OF THE INVENTION

Figures 3A, 3B:
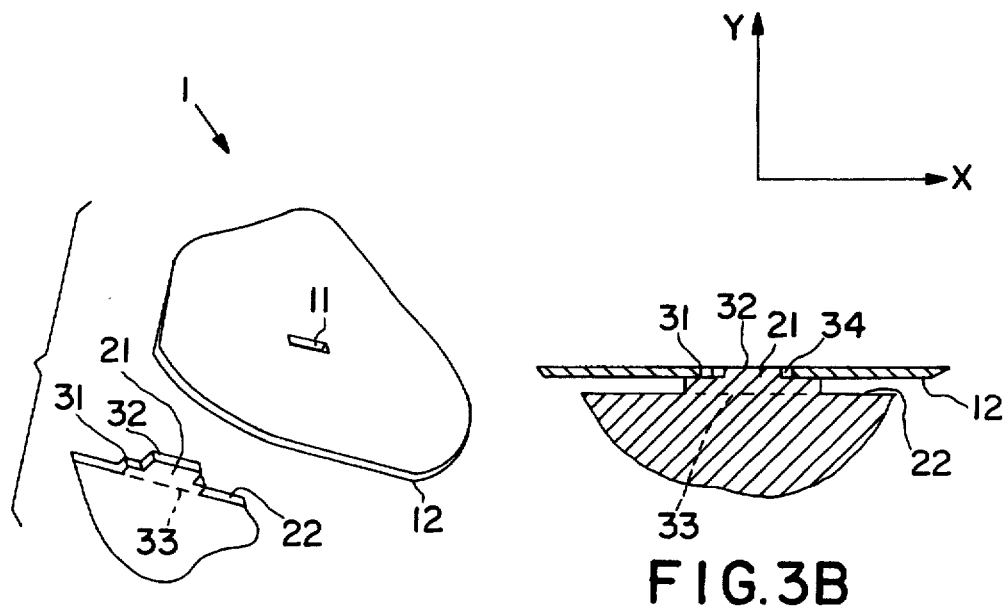
FIGS. 3A and 3B show a fragment of an assembly of two panels according to the present invention in exploded perspective and in section respectively, wherein the distance between the panels is correct in one dimension.

Reference is first made to FIG. 1, in which there is illustrated a schematic side view of an apparatus with a frame comprising panels 1 and 2 which may suitably be steel plates or the like.

One possible arrangment for such panels is illustrated in a fragmentary perspective view in FIG. 2, which is intended to serve a special purpose, in addition to the actual structure shown, of introducing some specific terms in relation to the detailed description which follows.

In this FIG. 2, there is indicated a rectangular coordinate system having a X, a Y and a Z axis in conjunction with an assembly in which a first panel 1 is held in spaced apart vertical relation to a similar panel (not identified by number) by a second panel 2 intervening between them. The first panel 1 has a slot 11 therein separated from a lower edge by a supporting portion 12 and the similar panel is similarly constructed. The second panel 2 has a projecting tongue or tab 21 extending outwardly from each of two opposite edges thereof, one of which is designated 22, the tabs lying in the same plane as the body of panel 2.

The complementary shapes of panels 1 and 2 permit them to be assembled and held in an exact position before an optional final fastening together by fastening means. For example, in the assembly in question, it is desired order to attain a correct distance (indicated schematically in Y-direction as $Y_d$ in the coordinate system of FIG. 1) between the two vertical panels, i. e. panel 1 and its undesignated mate Referrence is made now to FIGS. 3A and 3B, which illustrate as a first embodiment of the present invention with an assembly of two panels 1 and 2 which can be a fragment of the assembly of FIG. 2 and bears the same numerical designations. Panel 1 is provided with at least one insertion slot 11 and panel 2 is provided with at least one projecting tab 21 extending outwardly from one edge 22 thereof, which is adapted to fit in slot 11. As seen in FIG. 3, projecting tab 21 has at least one shoulder edge 31, of which two are shown on opposite sides of the tab, located between its free edge or extremity 32 and its base 33 indicated in broken lines. A portion of panel 1 laterally adjacent to at least one side of insertion slot 11, in this case on both such sides, makes abutting contact 12 with shoulder edge 31 of panel 2, as the projection tab 21 is introduced into the insertion slot 11 and as a consequence of such abutting contact, edge 22 of second panel 2 is held out of contact with first panel 1.

Generally, the projecting length of projecting tab 21, defined by the Z-distance between the free edge 32 and the base 33 of the tab 21, is slightly greater than the thickness of panel 1, so that tab 21 will project just slightly beyond the other side of panel 1.

In order to facilitate the introduction of tab 21 into slot 11, the end edge of said tab 21 may be chamfered or tapered (not shown).

Figure 11:
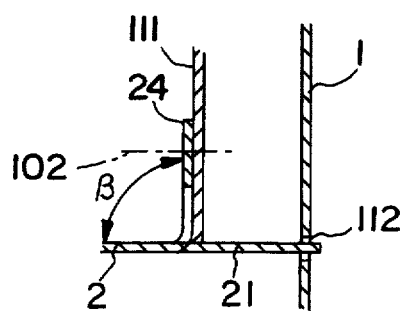
FIG. 11 is a diagrammatic view of yet another variation of the arrangement of FIG. 8 according to the present invention modified for mounting a third panel.

In order to attain a precise position of panel 2 with respect to panel 1 in the direction of the Y axis, being normal to the surface of shoulder 31, in most of the prior art, the machining tolerances of the panels are rather tight. It is a surprising advantage of the present invention, that even with rather broad tolerances of the individual panels 1, 2, a high end accuracy of the total frame may still be achieved. Indeed, it is only required for panel 2 that each shoulder 31 (intentionally shadowed in full black in FIGS. 3, 6, 7 and 8) should be shaped, i. e. punched, with sufficient accuracy. The remaining faces which have no abutment nor positioning function (as e.g. the top edge 32 of the tab) may be made with a normal precision as it results from usual punching tolerances. For panel 1, it is required that the "X-length" (representing the dimension in a direction according to the X axis) of insertion opening 11 and the "Z-width" (representing the dimension in a direction according to the Z axis) of that opening 11 be not smaller than the respective X-length and Z-width of the corresponding tab 21 (see clearances 34 in the X direction indicated in FIGS. 3 and 6, and clearances 112 in the Z direction as indicated in FIG. 11).

In the case of a perpendicular engagement between panels 1 and 2 (as already illustrated in FIGS. 1, 2 and 3), the prior state of the art usually bends an angled portion or a flange at the Y-directed edge 22 of panel 2. This flange then generally serves to make an abutting contact between panels 1 and 2, when fastened by e.g. a bolt connection. The prior art bending of panel 2 in order to make such a flange inherently causes bending tolerances, which are standardised in e.g. the German DIN 6930. The present invention does not use any bending for abutting panels 1 and 2, but mainly uses a punching or cutting operation with inherent punching tolerances. Generally, these punching tolerances are about two times smaller than correspondent bending tolerances (for the same materials, thicknesses and lengths). This can be confirmed by reference to DIN 6930, especially part II.

It follows from the above that the assembly according to the present invention has much better positioning tolerances than the prior art. Hence, the distance between the assembled panels 1 and 2 is correct in at least the Y-direction, and this without the use of supplementary positioning means, or of complicated machining.

It may be clear that the disclosed panel assembly provides a simple construction which is adapted to be positioned in a predictable fashion, despite variations in the thicknesses of the panels.

Figure 14:
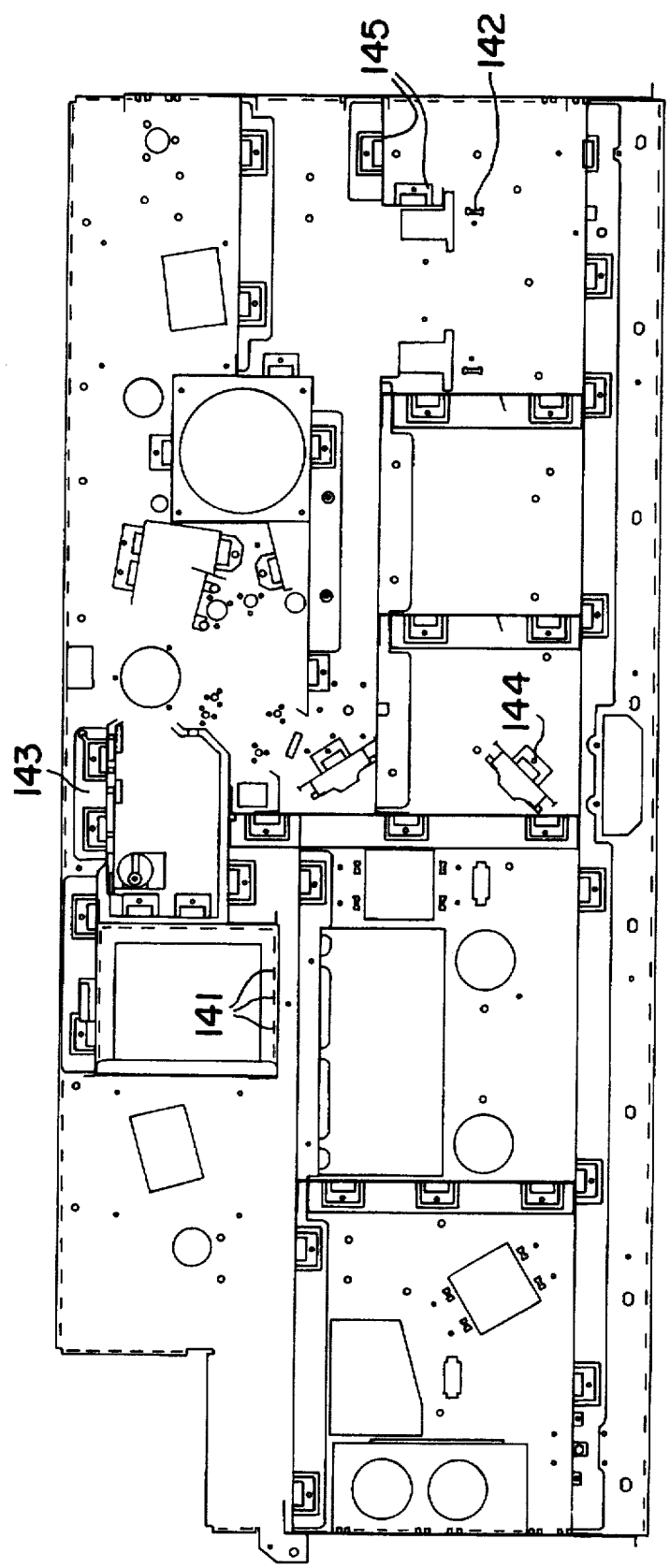
FIG. 14 is a longitudinal side view of an apparatus utilizing a plurality of panel assemblies in accordance with the present invention.

From the foregoing explanation, it will be clear that the concept of the present invention may be applied to the edges of a frame (as suggested by the introductory FIG. 1), but also at interior positions, at some distance within panel 1 (which will be illustrated in FIG. 14, to be described further on).

After having explained the basic principle of the present invention, now the practical implementation in several other embodiments will be described, without limiting the scope of protection of the present application. Various modifications may be possible for those skilled in the art after receiving the teachings of the present disclosure, without departing from the scope thereof.

In a preferred embodiment of the present invention (see FIG. 3), the projecting tab has two shoulder edges, formed by corresponding tab portions, one at each lateral side of the tab.

Figure 4:
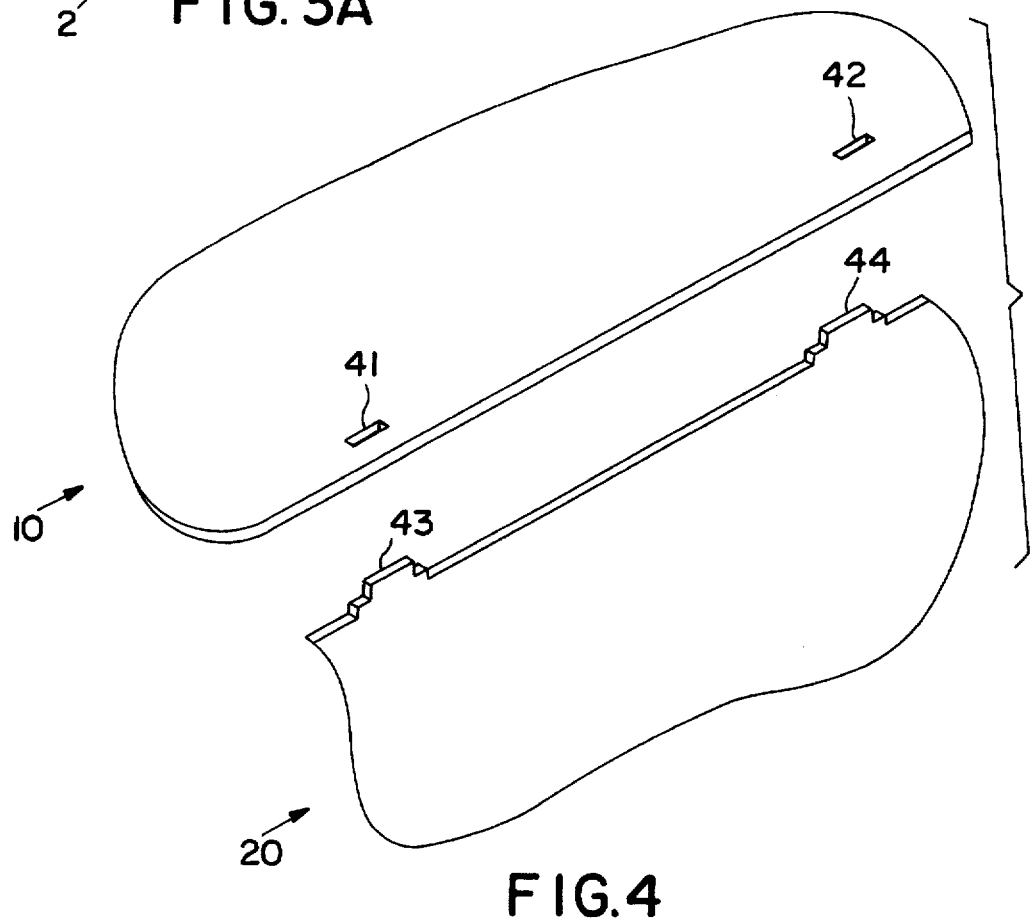
FIG. 4 is a further embodiment of the present invention comprising two projection tabs in a same plane.

It should be clear that in practice a given panel 2 may have more than one tab 21. Especially if the panels 1 and 2 are rather large in size, it is often advantageous, in order to align both panels precisely over their total length, to provide several sets of cooperating tabs and slots. FIG. 4 illustrates a case where two tabs 43 and 44 are used, lying substantially in a same plane of a second panel, with a first panel 1 which accordingly comprises two corresponding insertion slots 41 and 42.

Figure 5:
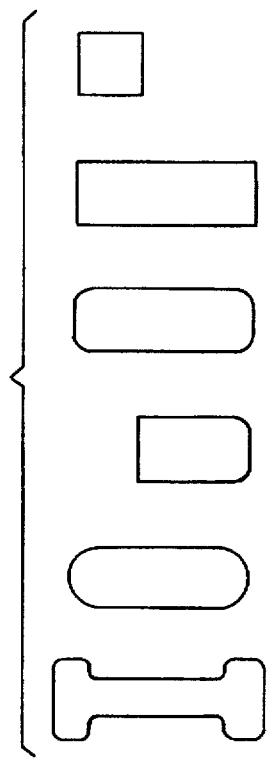
FIG. 5 is a collective view of several possible cross sections that can be taken by an insertion slot according to the present invention.

In a preferred embodiment of the present invention, the cross sectional shape of a tab corresponds generally with the shape of the corresponding insertion slot. Preferably, the tab is located in the plane of said second panel 2. Generally, both cross-sections may have a rectangular or a non- rectangular corresponding shape, a number of possible shapes being illustrated in FIG. 5. These possible cross-sections of an insertion slot according to the present invention can guarantee a correct positional accuracy, as will be clear from the further disclosure of the present invention.

Figures 6A, 6B:
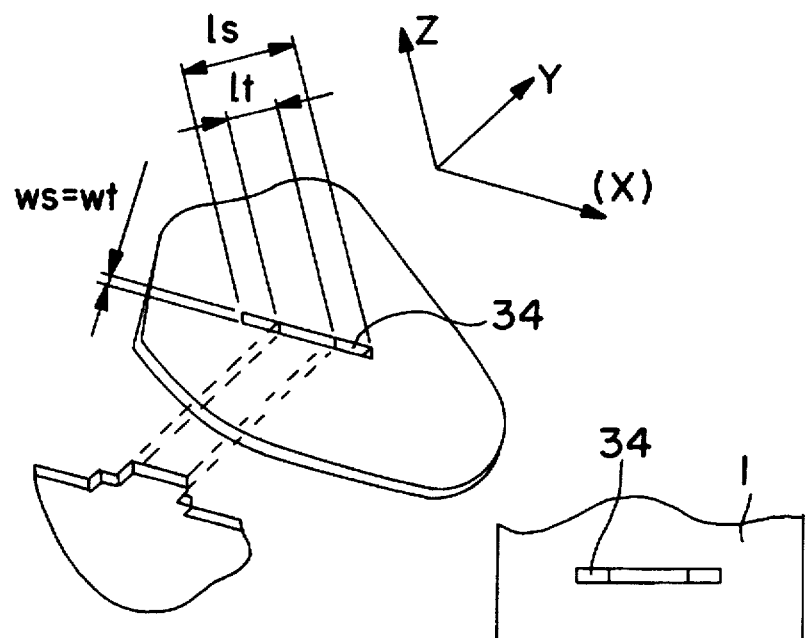
FIGS. 6A and 6B show a fragment of an assembly of two panels according to the present invention in exploded perspective and in section respectively, wherein the distances between the two panels are correct in two dimensions.

With the invention, one may also attain a precise position of panel 2 to panel 1 as regards distances in the dimensions of the Y axis and also of the Z axis, as is illustrated in FIG. 6 showing a further embodiment of the present invention. Herein the slot width $w_s$ is punched with high precision, thereby achieving close width tolerances, so that the projecting tab 21 and the slot 11 may be fitted without any clearances in the Z direction. In order to emphasize these important relations, in FIG. 6 it is expressively indicated that the X-length of the insertion slot $l_s$ is substantially greater than the X-dimension, or width, of the tab $l_t$ ($l_s > l_t$), whereas the Z-width of the slot $w_s$ is substantially equal to the Z-dimension, or thickness, of the tab $w_t$ ($w_s = w_t$).

To avoid any misunderstanding, it is underscored again that the present invention is free of any adverse effects of bending tolerances. Herefrom it follows that after assembling 1 and 2 together according to FIG. 6, their relative Y positions as well as their relative Z positions are very exact, even after several assemblies and dissasemblies.

Figures 7A, 7B:
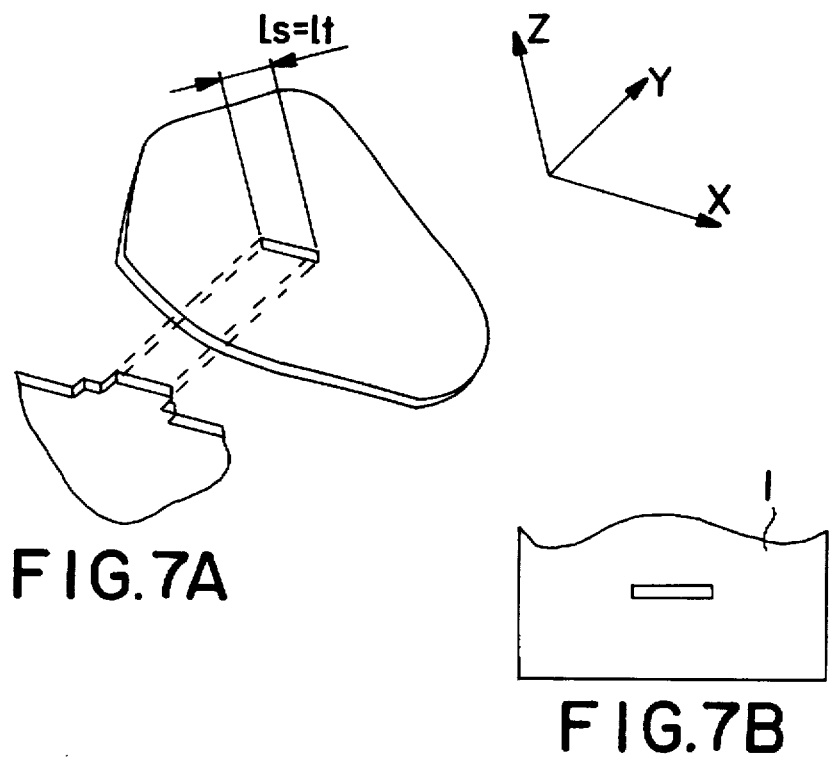
FIGS. 7A and 7B are views similar to FIGS. 6A and 6B, wherein the distances between said panels are correct in tree dimensions.

In order to illustrate how one may attain also a precise position of panel 2 to panel 1 as regards the distances in the dimensions of all three of the Y axis, the Z axis, and the X axis, FIGS. 7A and 7B illustrate a further embodiment of the present invention. Herein the slot length $l_s$ is punched with high precision and thus close length tolerances, so that the projecting tab 21 and the slot 11 may mate without any clearances in the X direction, so that $l_s = l_t$. Herefrom it follows that after assembling panels 1 and 2 together according to FIG. 7, the resulting arrangement is devoid of any disturbing gap between them, their relative X, Y and Z positions are all very exact, even after occasional several assemblies and dissasemblies.

Figure 12:
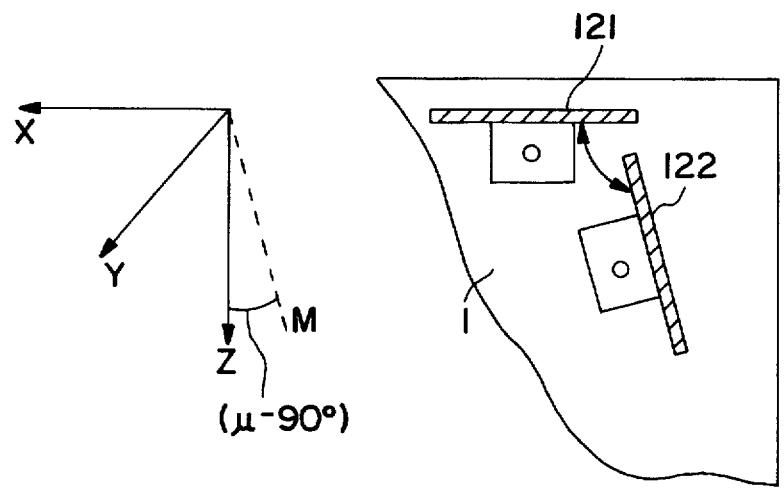
FIG. 12 is a schematic view of two distinctive assemblies mounted under an exemplary mounting angle μ.

Remembering the objects of the invention, one has the option of replacing the high precision punching of panels 1 and 2 as illustrated in FIG. 7A and 7B, respecting all 3 dimensions X-Y-Z, with two separate and more economical assemblies (as will be disclosed later with reference to FIG. 12).

Now that the positioning of the two panels 1 and 2 in terms of distance, at least in one direction as e.g. the Y direction, has been explained, further attention can be directed to the angular position of both panels.

Figure 8:
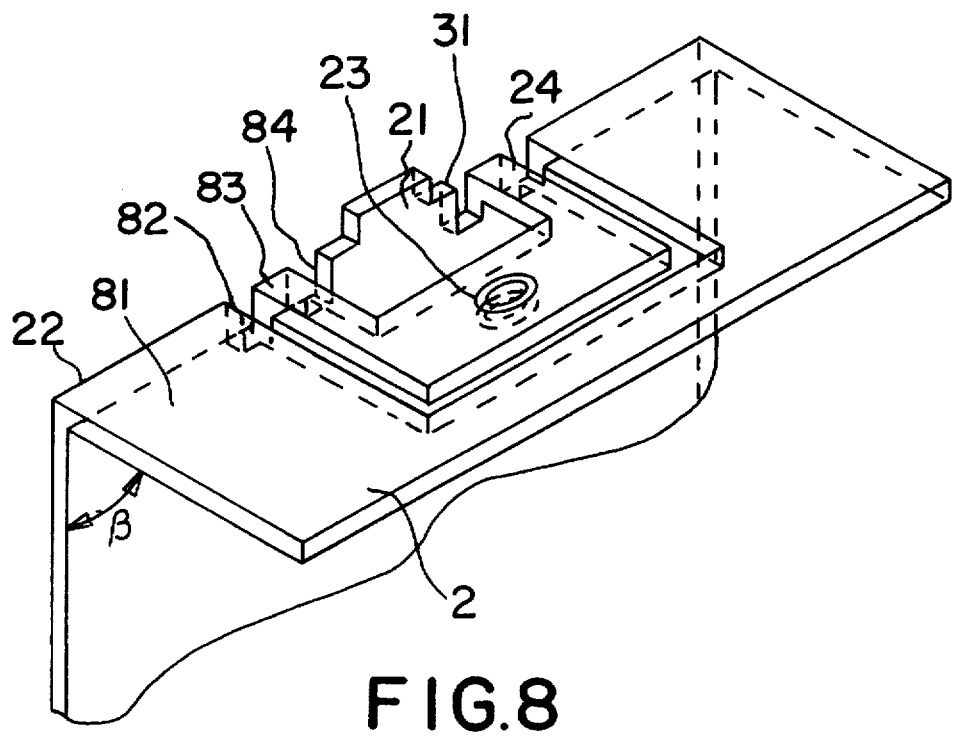
FIG. 8 is a perspective of a portion of a second panel useful in the assembly of the invention which is provided with an interconnection element formed as an integral right-angled panel portion.

For this purpose, according to the present invention, one may resort to the use of at least one interconnection element for interconnecting panel 2 to panel 1, which may be a separate interconnection element (possibly riveted onto panel 2) or which may be an integral portion of panel 2. FIG. 8 illustrates in perspective from one side a portion of a panel 2 according to a preferred embodiment, which is provided with at least one interconnection element which will be used for interconnecting panel 2 to panel 1.

In a preferred embodiment, the interconnection element of panel 2 is constituted by an integral angled portion 24, partially surrounding the projecting tab 21, and lying on a plane slightly below, i. e. inwardly of the panel, the plane of shoulder edge 31, e.g. by some 0.3 mm, so that it does not make any contact with panel 1, at least until it is fixed or secured by any fastening means (to be described further on).

More specifically, second panel 2 comprises an outer flange 81, an outer peripheral recess or channel 82, an angled portion 24 connected to the body of panel 2 by at least one connecting strip 83, an inner recess 84 and the already described projecting tab 21 which is surrounded by inner recess 84.

Recalling the objects of the invention, it is very important to emphasize once again the fact that the geometrical precision of the assembly according to FIG. 8 is not influenced by bending techniques (e.g. for forming angled portion 24), but is essentially determined by punching techniques (defining the shoulder edge on the projecting tab). As a consequence,the flange 81 of panel 2 may be formed by any of the usual bending techniques, but since it does not contact panel 1, it does not affect the positional precision of both panels. Nevertheless, flange 81 actually imparts a higher stiffness to panel 2, such that the original geometrical precision definitely remains stable during the lifetime of any apparatus in which the assembly is employed.

As was already indicated in FIG. 1, the assembly according to the present invention preferably has panels 1 and 2 arranged at a right angle α to each other. But, in practice (see FIG. 9), panel 2 may further comprise an angled portion 24 extending at a bending angle β relative to the body of panel 2 for supporting first panel 1. In practice, angle β is between 70° and 110°, preferably 90°. If the angle β is not 90°, any vertical position on the inclined panel 1 obviously has to be calculated with the aid of applicable geometric relationships, such as e.g. Z=Z'. COS (B-90°).

Figure 9:
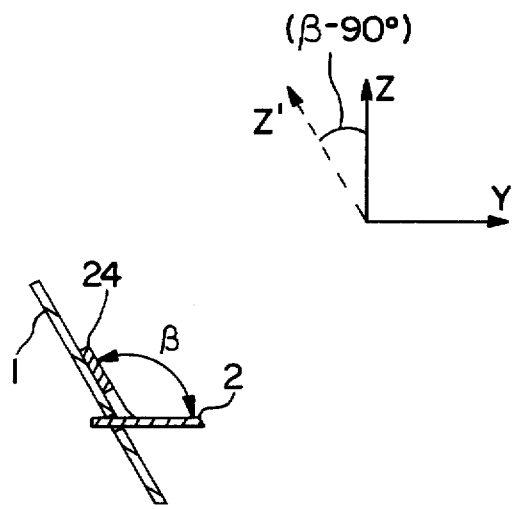
FIG. 9 is a diagrammatic view of an alternative embodiment of the arrangement of FIG. 8 wherein the interconnection element has a non-perpendicular bending angle β.

When comparing FIG. 1 and the just described FIG. 9, it is quite evident that, in simpler cases, α generally equals β. However, this is not always true, because different combinations are easily possible.

In a further preferred embodiment of the present invention, the assembly further comprises at least one fastening means (not shown separately) for securing said panels 1, 2 to each other and to inhibit relative movement therebetween. Indeed, even if the projecting tabs 21 engage tightly into the insertion slots 11, both panels have to be held in correct and fixed operative relationship. On the one hand, the fastening means may be removable, examples of which include a bolt and nut, a self tapping screw, an anchorage with threads (defined in DIN 7952) or a screw and a screw receptable (as defined earlier in the background of the invention). On the other hand, the fastening means can be permanent, as e.g. in the case of a pop rivet, a spotweld or a suitable glue. Obviously in the case of fastening by spotwelding or by glueing, fastening holes (as indicated by reference numeral 23 in FIG. 8) are not required, either in panel 1, or in panel 2, and may be omitted.

It is of importance to appreciate that the face of the angled portion 24 lies below the shoulder edge 31, so that it does not actually make contact with the first panel 1 as long as panels 1 and 2 are merely in assembled condition without any fastening means in place. When a fastening means is introduced, angled portion 24 may be flexed towards the first panel 1. Yet, this does not influence the relative Y distance, which is defined solely by the abutment of the shoulder edge 31 against the inner face of panel 1.

In order for the angled portion 24 to make contact with panel 1, said angled portion 24 clearly has to be displaced towards panel 1, which may occur when sufficient stress on the angled portion by the fastening means, whether removable or non removable.

If the panel 2 should have a relatively large thickness, such that flexing of the angled portion 24 would be rather difficult, a solution may be given hereto by making the connecting strip(s) proportionally smaller (see FIG. 8), so that the resistance of the strips to flexing is sufficiently reduced.

Figure 10:
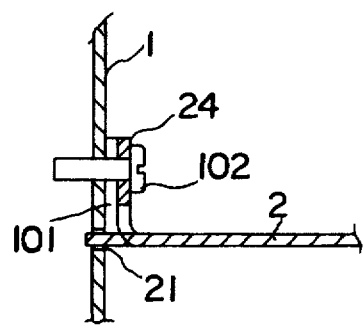
FIG. 10 is a diagrammatic view of another variation of the arrangement of FIG. 8 according to the present invention which includes a resilient material and fastening means.

In a modified embodiment, another approach to this bending difficulty may reside in placing a resilient material or some glue between the contiguous faces of the angled portion and panel. In either of these cases, the distance between angled portion 24 and the panel 1 can be easily bridged, without subjecting the fastening means to extremely high tension forces. FIG. 10 illustrates such an alternative approach according to the present invention wherein a resilient material 101 is interposed between the panel 1 and the angled portion 24 secured together by a fastening means 102.

In a further preferred embodiment of the present invention, which is not illustrated, the second panel is provided with two tabs, one in a same plane as the body of the second panel and the other carried by an angled portion.

In FIG. 11, there is illustrated an alternative assembly according to the present invention, wherein panel 2 is provided with at least one angled portion 24 partially surrounding a projecting tab 21 but lying in a plane separated some distance, e.g. some millimeters, from the plane of shoulder edge 31 for supporting a first panel 1 or even a third panel 111. In the case illustrated by FIG. 11, the assembly according to the present invention generally will include a supplementary fastening means 102 for securing at least two of the panels (1, 2 and/or 111) to each other. The embodiment of FIG. 11 may advantageously be applied in exterior covering panels (e.g. that designated 1 in the drawing) of an apparatus, whenever an exposed fastening means might be deemed objectionable, e.g. for esthetic reasons. This might be accomplished by anchoring the fastening means 102 to an unexposed interior panel 111.

To repeat, angled portion 24 may optionally have a bending angle β between 70° and 110°, preferably 90°.

In four further preferred embodiments of the present invention, a combination may be made of the arrangments of FIGS. 9 and 10, 9 and 11, 10 and 11 or 9, 10 and 11 (not shown separately).

From the foregoing discussion and as illustrated by FIG. 9, it will be understood that the individual panels 1, 2 and 111 are not restricted to strict vertical nor strict horizontal positions. Thus, it is within the scope of the present invention to make use of at least two distinct assemblies, sharing one common panel, which are mounted under a relative mounting angle μ which may be 90° or other than 90°, as illustrated by FIG. 12. Such embodiment with μ being substantially not perpendicular may advantageously be utilized in connection with optical lightshafts, papertrays, in inclined keypanels, etc.

In order to calculate the spatial positions of different elements of a multi-assembly arrangement, one has to apply the relevant geometrical relationships. For example, if the axis-system corresponds to that indicated in FIG. 12, for panel 121 no corrections are necessary, but for panel 122, there following equaitions may e.g. apply: $Z=M \cdot \cos(\mu-90°)$ and $X=M \cdot \sin(\mu-90°)$.

Optionally one may use two such separate assemblies with μ intentionally selected to equal 90° instead of the above mentioned high precision punching of panels 1 and 2 with respect to all three dimensions X-Y-Z, as illustrated in FIG. 7. In other words, it may be more economical to use two second panels 121 and 122 (as illustrated in FIG. 12) fabricated with standard precision and mounted under an angle μ=90° rather than a single second panel 2 made by high precision punching.

Keeping in mind the objects of the invention, it is very important to comprehend the fact that the geometrical precision of the assembly is essentially achieved by punching techniques (defining shoulder edge 31 on projecting tab 21). In addition, it should not be overlooked that the base line 33 of the tab or edge 22 of panel 2 essentially do not contact panel 1 and hence do not affect the precise positioning of the panels.

Figure 13A:
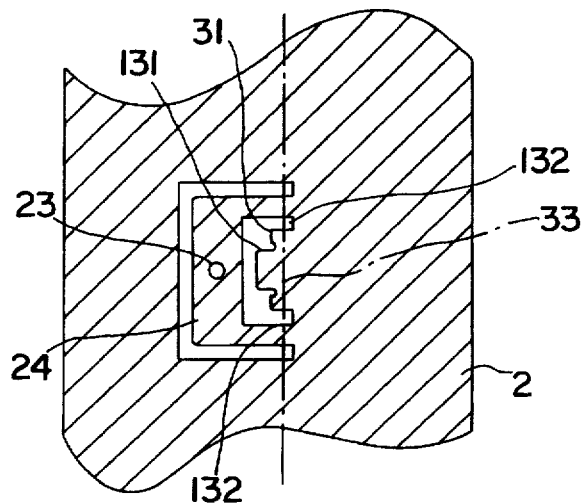
FIGS. 13A and 13B are partial plan views of two different configurations for the second panel of the invention.
Figure 13B:
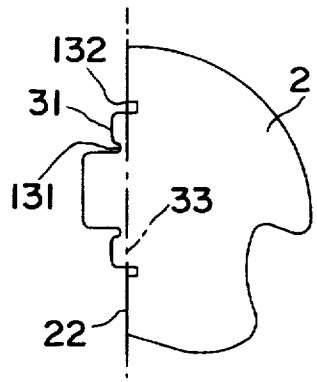

FIGS. 13A and 13B show plan views of two different second panels 2, both seen after punching, with or without a fastening hole 23, but before any possible bending, e.g. of an interconnecting element, is carried out. It will be noted that each shoulder 31 may have a shallow notch or groove therein directly adjacent to the lateral sides of the projection tab (not designated in these figures) to facilitate a more precise definition of the shoulder. In addition, the panel edge at the lateral extremes of the shoulders may be notched or grooved as at 132 to facilitate the bending of the angled portion 24.

FIG. 14 is a side view of a practical apparatus and incorporates many of the abovementioned embodiments, some of which now are recapitulated. Numeral 141 indicates an assembly comprising three projection tabs (cf. FIG. 4); numeral 142 designates an insertion slot having a non rectangular cross section (cf. FIG. 5); numeral 143 indicates the integration of two panel elements 2 in one unit; numeral 144 indicates an angled position for one panel (cf. FIG. 12); numeral 145 indicates an relative mounting angle μ=90° for two panels (cf. FIG. 12), etc.

With the present disclosure in mind, various modifications will be within the skill of one skilled in the art without departing from the scope of the invention.

It will be understood that the manufacture of panels useful in the invention, in particular in the formation of the co-operating tabs and openings, can also be carried out by other techniques than punching or die-die-stamping, e.g. by laser-cutting. Of course, the final precision of the assembly will depend on the manufacturing tolerances of such other technique.

Preferably, panels 1 and 2 are made from sheet steel which has been punched to obtain the correct tab and slot configurations. But the same concept may be applied to some plastic materials (such as e.g. those sold under the tradenames Lexan, Makrolon and Perspex). With suitable plastic materials, the punching or laser-cutting operation may optionally be replaced by other manufacturing operations, such as injection moulding.

We claim:

1. A panel assembly comprising a generally planar first panel having at least one insertion slot therein and a generally planar second panel arranged at a substantial angle to said first panel, said second panel having at least one projecting tab which projects outwardly from at least one edge thereof to terminate in a free end and fits into one of said insertion slots, said tab including at least one shoulder located at a point along the projecting length of said tab which is between said free end of the top and said one edge of said second panel, and said shoulder defining a generally straight shoulder edge directed generally perpendicular to the tab length which is in abutting contact with a portion of said first panel adjacent said insertion slot, whereby said one edge of the second panel is maintained out of contact with said first panel, said first panel having margins around each said insertion slot and each said tab being free of portions disposed in overlying relation to said margins of said first panel.

2. An assembly according to claim 1, wherein the cross sectional shape of said projecting tab corresponds generally with the shape of said insertion slot.

3. An assembly according to claim 1, wherein said projecting tab has a shoulder defining a shoulder edge on each of two opposite sides thereof and both of said shoulder edges in abutting contact with said first panel.

4. An assembly according to claim 1, wherein said second panel and has at least two projecting tabs projecting from the same edge or different edges of said second panel, which at least two tabs lie substantially in the same plane and wherein said first panel has corresponding insertion slots therein for reception of said at least two tabs.

5. An assembly according to claim 1, wherein said second panel is provided with at least one interconnection element for mechanically attaching the same to said first panel.

6. An assembly according to claim 5, wherein said interconnection element comprises an angled portion (24) of said second panel partially surrounding said projecting tab.

7. An assembly according to claim 6, wherein said second panel is attached to said first panel by fastening means engaging the angled portion and said first panel.

8. An assembly according to claim 7, wherein said angled portion of said second panel is free of contact with said first panel until engaged by said fastening means.

9. An assembly according to claim 1, wherein said panels are made from sheet metal which has been punched to obtain the correct tab and slot configuration.

10. An assembly according to claim 6, wherein said second panel has been cut and bent out of the plane thereof to form said angled portion.

11. An assembly according to claim 6, which further comprises a resilient material located between said first panel and the angled portion of said second panel.

12. An assembly according to claim 1, wherein said first panel has one face proximate to said shoulder edge of said second panel and an opposite face remote from said shoulder edge and said free end of each said projecting tab on said second panel is substantially flush with said opposite face of said first panel.

13. An assembly according to claim 1, wherein each said tab along the length thereof between said shoulder and said free end has lateral edges extending generally angularly to said shoulder edge, and said lateral edges of said tab lie within the confines of insertion slot into which said tab fits.

* * * * *